(12) United States Patent
Mellor (10) Patent No.: US 12,430,461 B2
(45) Date of Patent: Sep. 30, 2025

(54) QUERY LIMITING AND TRACKING IN A DATA SHARING ENVIRONMENT

(71) Applicant: NBCUniversal Media, LLC, New York, NY (US)

(72) Inventor: David Mellor, Lynnfield, MA (US)

(73) Assignee: NBCUniversal Media, LLC, New York, NY (US)

( * ) Notice: Subject to any disclaimer, the term of this patent is extended or adjusted under 35 U.S.C. 154(b) by 210 days.

(21) Appl. No.: 18/327,428

(22) Filed: Jun. 1, 2023

(65) Prior Publication Data
US 2023/0394166 A1 Dec. 7, 2023

Related U.S. Application Data

(60) Provisional application No. 63/348,900, filed on Jun. 3, 2022.

(51) Int. Cl.
G06F 21/62 (2013.01)
H04L 9/32 (2006.01)

(52) U.S. Cl.
CPC ........ *G06F 21/6227* (2013.01); *H04L 9/3213* (2013.01); *H04L 9/3297* (2013.01)

(58) Field of Classification Search
CPC .. G06F 21/6227; H04L 9/3213; H04L 9/3297
See application file for complete search history.

(56) References Cited

U.S. PATENT DOCUMENTS

| 11,625,783 | B1* | 4/2023 | Gordon, III | H04L 9/50 |
| | | | | 705/37 |
| 12,197,454 | B2* | 1/2025 | Aucinas | H04L 63/20 |
| 2011/0078779 | A1* | 3/2011 | Liu | G06F 21/6254 |
| | | | | 726/28 |
| 2013/0212704 | A1* | 8/2013 | Shablygin | G06F 21/6218 |
| | | | | 726/28 |
| 2017/0099293 | A1* | 4/2017 | Tan | H04L 67/535 |
| 2017/0235490 | A1* | 8/2017 | Tan | G06F 21/10 |
| | | | | 711/152 |
| 2019/0236594 | A1* | 8/2019 | Ehrlich-Quinn | G06Q 20/401 |
| 2022/0207524 | A1* | 6/2022 | Geusz | G06Q 20/227 |
| 2022/0391895 | A1* | 12/2022 | Weber | G06Q 20/3823 |
| 2023/0069247 | A1* | 3/2023 | Kucherov | G06F 16/955 |
| 2023/0075884 | A1* | 3/2023 | Jakobsson | H04L 9/50 |
| 2023/0080808 | A1* | 3/2023 | Padmanabhan | G06Q 20/405 |
| | | | | 705/64 |
| 2023/0325814 | A1* | 10/2023 | Vijayan | G06Q 20/3829 |
| | | | | 705/66 |
| 2023/0368191 | A1* | 11/2023 | Padmanabhan | G06Q 20/127 |

* cited by examiner

Primary Examiner — J. Brant Murphy
(74) Attorney, Agent, or Firm — Fletcher Yoder, P.C.

(57) ABSTRACT

The present disclosure relates generally to techniques for limiting and tracking queries in a data sharing environment such as a data cleanroom. A shared tokening may provide owner account control over sharing to client accounts within the data sharing environment.

19 Claims, 6 Drawing Sheets

QUERY LIMITING AND TRACKING IN A DATA SHARING ENVIRONMENT

CROSS-REFERENCE TO RELATED APPLICATION

This application claims priority to and the benefit of U.S. Provisional Application No. 63/348,900, entitled "QUERY LIMITING AND TRACKING IN A DATA SHARING ENVIRONMENT" and filed Jun. 3, 2022, which is incorporated by reference herein in its entirety for all purposes.

BACKGROUND

The present disclosure relates generally to techniques for limiting and tracking queries in a data sharing environment such as a data cleanroom. More specifically, the present disclosure relates to methods and systems for managing query usage for securely sharing data internally within an organization and/or externally outside the organization.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Companies generally collect large amounts of data related to internal company activities and external data relating to partner organizations and customers of the company. Companies may have multiple business units across the company and may need to share collected data across the business units. Third-party cloud services may be used by the companies to store company data and to enable companies to grant restricted access to its data for purposes of running queries on portions of the organization's data. In this model, there is a potential for abuse by malicious users who could run a large number (e.g., millions) of queries in order to potentially stitch together a proprietary data set, leading to compromised data security. As such, a need exists to monitor and limit the usage of queries while enabling clients to perform authorized queries and actions.

BRIEF DESCRIPTION

The data sharing and processing methods disclosed within enable in place data sharing across an enterprise by storing and processing raw data using a single data source, and providing the data for sharing from the same single data source. The owner of the data may control what rate the data is exposed, how the data is exposed, and what restrictions to impose on the data in regard to data sharing from the single central data source. This method of in place data sharing enables owner control over the data being shared in a centralized manner. Additionally, the in place data sharing removes data duplication from the data sharing process and reduces data sharing processing costs. This is because entire sets of raw data do not need to be copied when the data is shared from the single data source. The in place data sharing also enables updated data to be shared, since the data will be retrieved from the updated original data source.

Additionally, the owner of the data may impose restrictions on the base data that is shared with one or more data requesting accounts. The owner of the data may then enable the requesting account to access the base data according to the restrictions imposed on the base data. The restrictions may include restricting access to certain customer information and/or certain fields of data depending on the level of access associated with the requesting account. The data requesting account may include identification and/or credentials that are associated with a level of access to the data. The data requesting account may then access the central data source storing the base data, and access the data corresponding to the level of access determined for the base data.

DRAWINGS

These and other features, aspects, and advantages of the present disclosure will become better understood when the following detailed description is read with reference to the accompanying drawings in which like characters represent like parts throughout the drawings.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1:
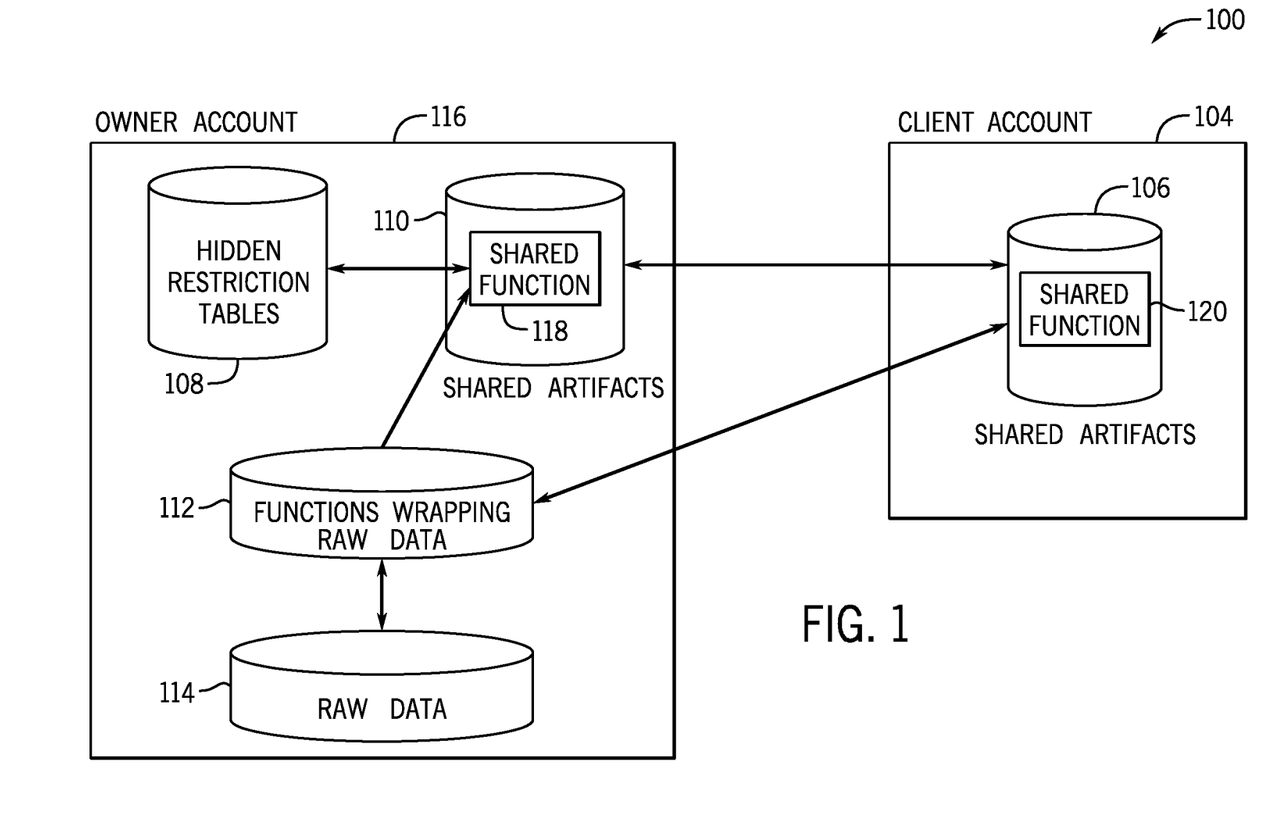
FIG. 1 is a schematic diagram illustrating a data sharing environment supporting client-initiated data queries, in accordance with certain embodiments.

FIG. 1 is a schematic diagram 100 illustrating a data sharing environment supporting client-initiated data queries. Referring to FIG. 1, an owner account 116 has raw data 114 in a database available for querying and sharing. The raw data 114 may be wrapped using a wrapper function 112, where the wrapper function 112 limits or filters what subset or portion of data within the raw data 114 can be seen or viewed by one or more client accounts (e.g., a client account 104). The owner account 116 may create a view or a shared function 118 within a shared function database 110. The shared function 118 may define the scope (e.g., amount, type) of data available to an entity executing the shared function 118. The owner account 116 may make the shared function 118 available to the client account 104 via a client shared function database 106 (e.g., as depicted by client-side shared function 120), such that the client account 104 can execute the shared function 120 in the client shared function database 106. In an aspect, the shared function 120 would execute on the client account 104, using resources of the client account 104, rather than on the owner account 116. When executed by the client account 104, the shared function 120 may execute or trigger one or more wrapper functions 112 to query the raw data 114. In an aspect, the one or more wrapper functions 112 may retrieve or return a subset of the raw data 114 and provide the subset to the client account 104.

As an example, the owner account 116 may be associated with a data aggregation company. The data aggregation company may store raw data 114 in a database available for querying and sharing with the client account 104 associated with an advertiser. To share a portion of the data with the advertiser, the data aggregation company may create wrapper functions 112 configured to wrap or filter the raw data 114 into a subset of data. The data aggregation company may also create one or more shared functions 118 that will execute or trigger one or more wrapper functions 112. The data aggregation company may allow or share the shared function 118 with the advertiser. In this case, the advertiser may execute the shared function 120 in the client shared function database 106 in order to obtain information from the raw data 114.

In FIG. 1, however, once the shared function 118 is provided to the client account 104, the shared function 120 executes in the client account 104 and not the owner account 116, making it difficult for the owner account 116 to control or limit the use of the shared function. The owner account 116 may not be aware whether the client account 104 is executing the shared function 120, including how many times the shared function 120 is executed.

Figure 2:
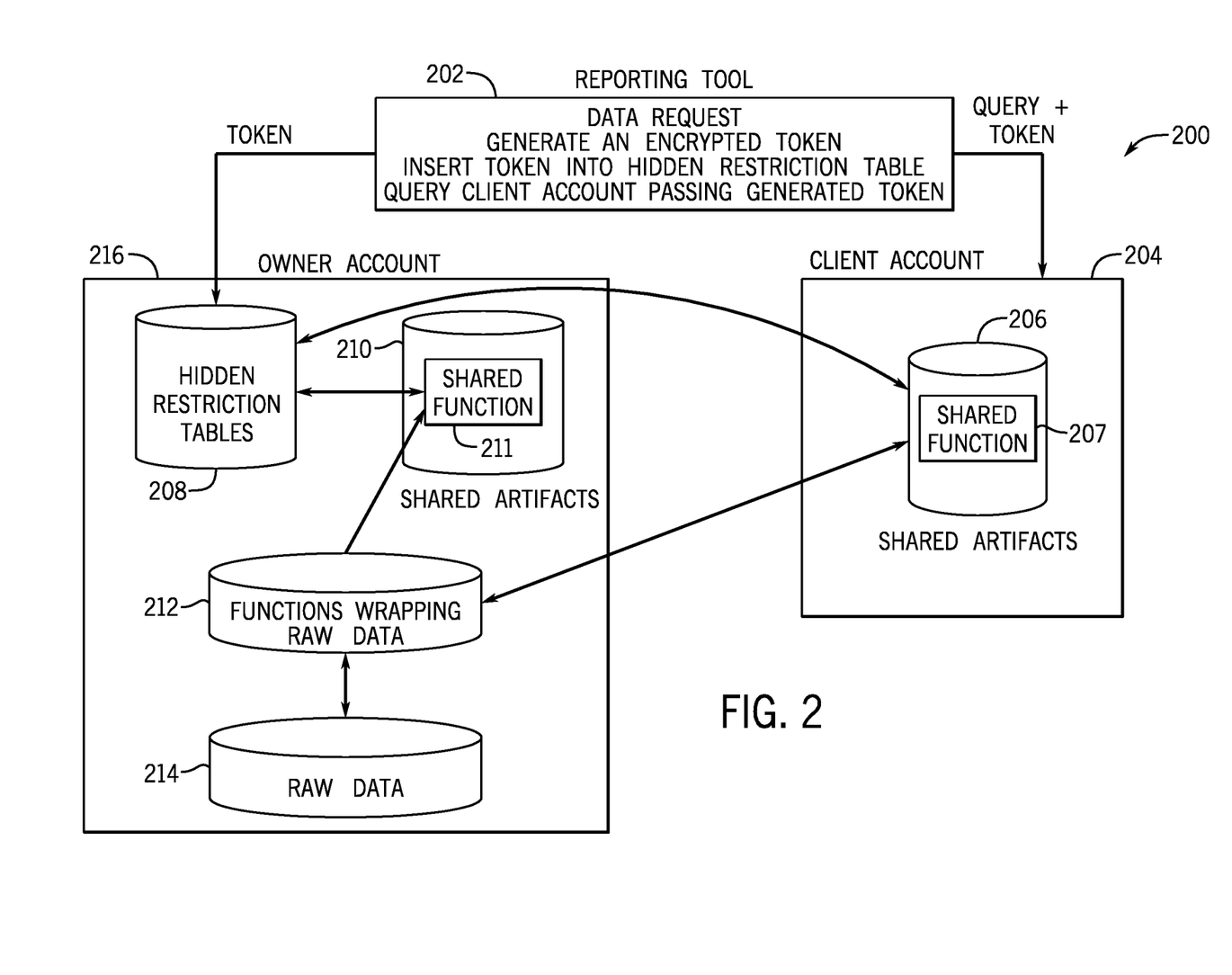
FIG. 2 is a schematic diagram illustrating a data sharing environment supporting techniques for monitoring and limiting client-initiated data queries, in accordance with certain embodiments.

FIG. 2 is a schematic diagram 200 illustrating a data sharing environment supporting techniques for monitoring and limiting client-initiated data queries. Referring to FIG. 2, to initiate a query, a client may interface with a reporting tool 202 (e.g., a business intelligence tool or reporting interface) to perform queries and to generate reports. In an aspect, the reporting tool 202 may be operated by an owner account 216 who authorizes the client to access the reporting tool 202 (e.g., using login credentials). The reporting tool 202 may be pointing to a client shared function database 206 associated with a client account 204 for the client, where the client shared function database 206 may contain a client shared function 207 that, when executed and authorized, may implement a data query via the wrapping functions 212. The client shared function 207 may be shared from an owner shared function database 210 containing an owner shared function 211 corresponding to the client shared function 207.

To use the reporting tool 202, the client may input a data request via the reporting tool 202. After receiving the request, the reporting tool 202 may generate a token (e.g., an encrypted token) based on the inputted request and provide the token to a table 208 associated with an owner account 216. The table 208 may be a hidden restriction table that is used to restrict when a shared function (e.g., owner shared function 211 of owner shared function database 210 and/or shared function 207 of client shared function database 206) may be executed. In an aspect, the token generated by the reporting tool 202 may be associated with and/or provided to the client and/or the client account 204. In another aspect, to generate the token, the reporting tool 202 may use as parameters one or more of the shared function, information associated with the client account 204 (e.g., client ID, subscription level, etc.), and/or a current time. In yet another aspect, the token and/or data associated with the token may indicate whether the client account 204 is permitted to execute the shared function 207, how many times the client account 204 is permitted to execute the shared function, and/or when the client account 204 is permitted to execute the shared function 207. The token may contain and/or be associated with a timestamp indicating when the token was generated and/or indicating a future time for which the token may be used, and the client account 204 may be permitted to execute the shared function 207 within a predetermined time interval of the timestamp. For example, the client account 204 may be permitted to execute the shared function if the timestamp associated with the token is within 5 seconds (or any other time interval) of the current time (e.g., the time when the client account 204 queries for data and/or causes the request for use of the shared function).

After generating the token, the reporting tool 202 may invoke the corresponding shared function within the client shared function database 206. In some embodiments, the shared function executes in the client account 204, and not in the owner account 216. The shared function may require the token as an input parameter, and the shared function in the client shared function database 206 may be configured to determine whether the client account 204 is authorized to execute the shared function before returning the requested information. If the client account 204 does not have access to the shared function and/or is attempting to execute the shared function outside of the permitted timeframe and/or other criteria, then the shared function may return null or no data. In addition to having the token as one of the parameters, the shared function may require any other parameters that may have been provided by the client.

Adding a timing element to the token is beneficial because the client account 204 has access to the token and is able to read it. With such access, if the token did not have a timing element, the client account 204 may simply copy the token received from the reporting tool 202 and reuse it later, resulting in the same problems raised earlier regarding the inability to limit client queries.

Returning to FIG. 2, upon being executed by the client account 204, the shared function will determine if a client token matches an owner token associated with the client account 204 in the table 208 (e.g., by accessing an indication of the owner token from table 208 and comparing the tokens in table 208 to the client token provided by the reporting tool 202 with an indication of the query that is based upon the data request inputted by the client at the reporting tool 202). If the client token does not correspond to an owner token, then the shared function will determine that the client account 204 does not have access to perform the query, and the query will fail (e.g., refraining from performing the query, refraining from returning query results, returning no data, and/or returning a null value or other indicator of unauthorized access or failure). If the client token matches an owner token associated with the client account 204, then the shared function may determine if the timestamp associated with the client token and/or the owner token matches token timing criteria set for data access via the query (e.g., whether the client token and/or owner token is within a timing interval or timing threshold of the current time (e.g., 5 seconds)). If not, then the shared function will determine that the client account 204 is attempting to perform the query outside of the approved time period, and the query will fail. Otherwise, if the timestamp is within a timing interval or time threshold, then the shared function will invoke one or more wrapping functions 212, which, in turn, will return a subset of the raw data 214 to the client account 204. In an aspect, the reporting tool 202 may maintain a table (or another data structure) to keep track of when and how many times each query or shared function is executed by each client. This information may be associated with the service charge, and the rates for the service charge may differ depending on the quantity of queries run, when the queries are run, and/or a subscription level of the client account 204.

Figure 3:
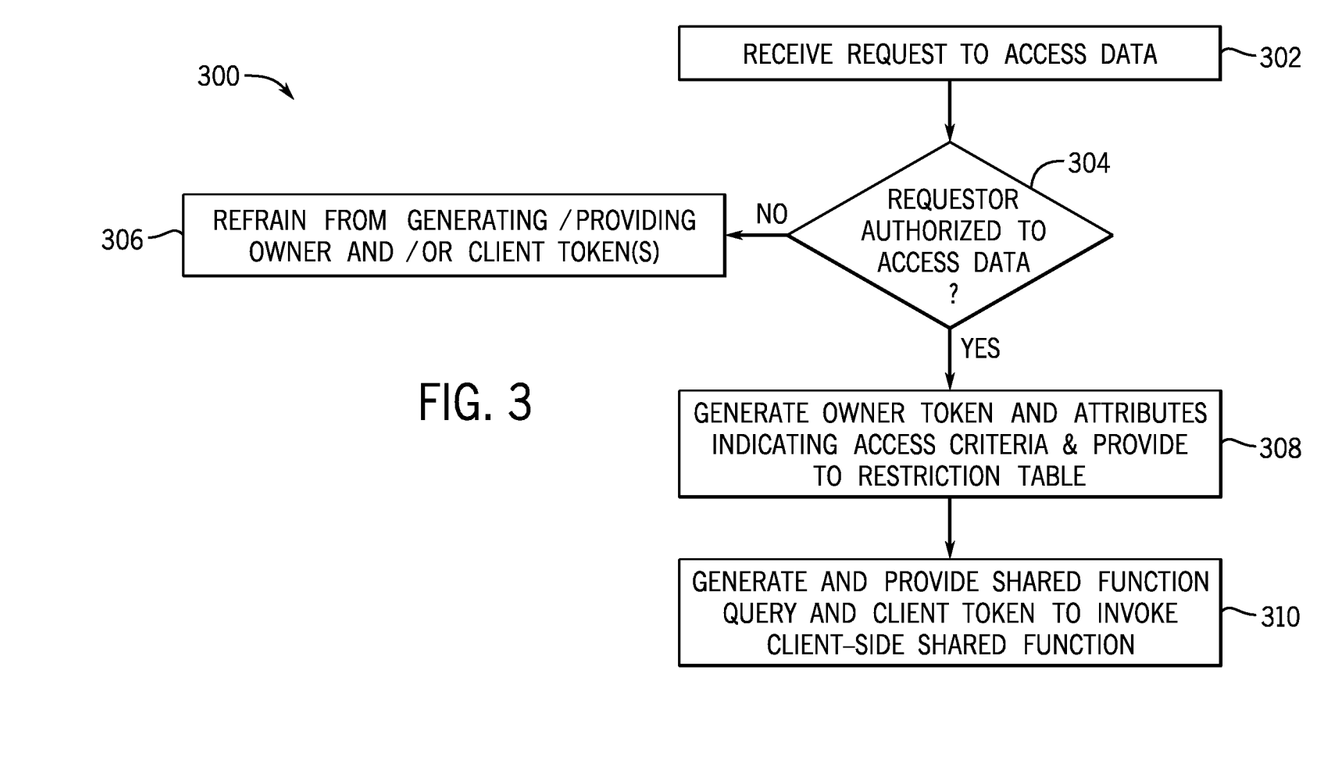
FIG. 3 is a flowchart, illustrating a process for token generation and provision, in accordance with certain embodiments.

FIG. 3 is a flowchart, illustrating a process 300 for token generation and provision, in accordance with certain embodiments. The process 300 begins with receiving a request for data access (block 302). For example, a client may access a graphical user interface (GUI) of reporting tool 202 of FIG. 2 to request a particular set of data from the data sharing environment.

A determination is made as to whether the requestor is authorized to access the requested data (e.g., the requested set of data) (decision block 304). In certain embodiments, the owner account 216 may set access constraints indicative of particular clients' access rights to particular data sets within the shared data environment. These access constraints may be compared to the client account 204 and the data requested to discern whether the requesting client account 204 is authorized according to the access constraints.

When the requestor is determined not to be authorized for the requested access to the data, a refrain from generating and/or providing an owner token (e.g., to the hidden restrictions table 208) and/or generating and/or providing a client token may be performed (block 306). For example, the request may be ignored, a notification may be provided to the client account 204 indicating that the client account 204 is not authorized for the requested access, or both.

When the requestor is determined to be authorized for the requested access to the data, an owner token and attributes indicative of the access criteria are generated and provided (block 308). For example, a token identifier may be inserted into the restriction table 208 and the access criteria may be associated with the token identifier in the restriction table 208, as illustrated in the example 600 of FIG. 6.

A query for execution by the client-side shared function is generated and provided along with a client token (e.g., a copy of the owner token) to the client account, enabling invocation of the client-side shared function (block 310). In this manner, the client account 204 may be afforded access to implement the client-side shared function to retrieve the requested data, in accordance with the associated access criteria, using the client token. The query may include instructions for the client-side shared function to use one or more of the wrapping functions 212 to obtain the requested data from the raw data 214.

Figure 4:
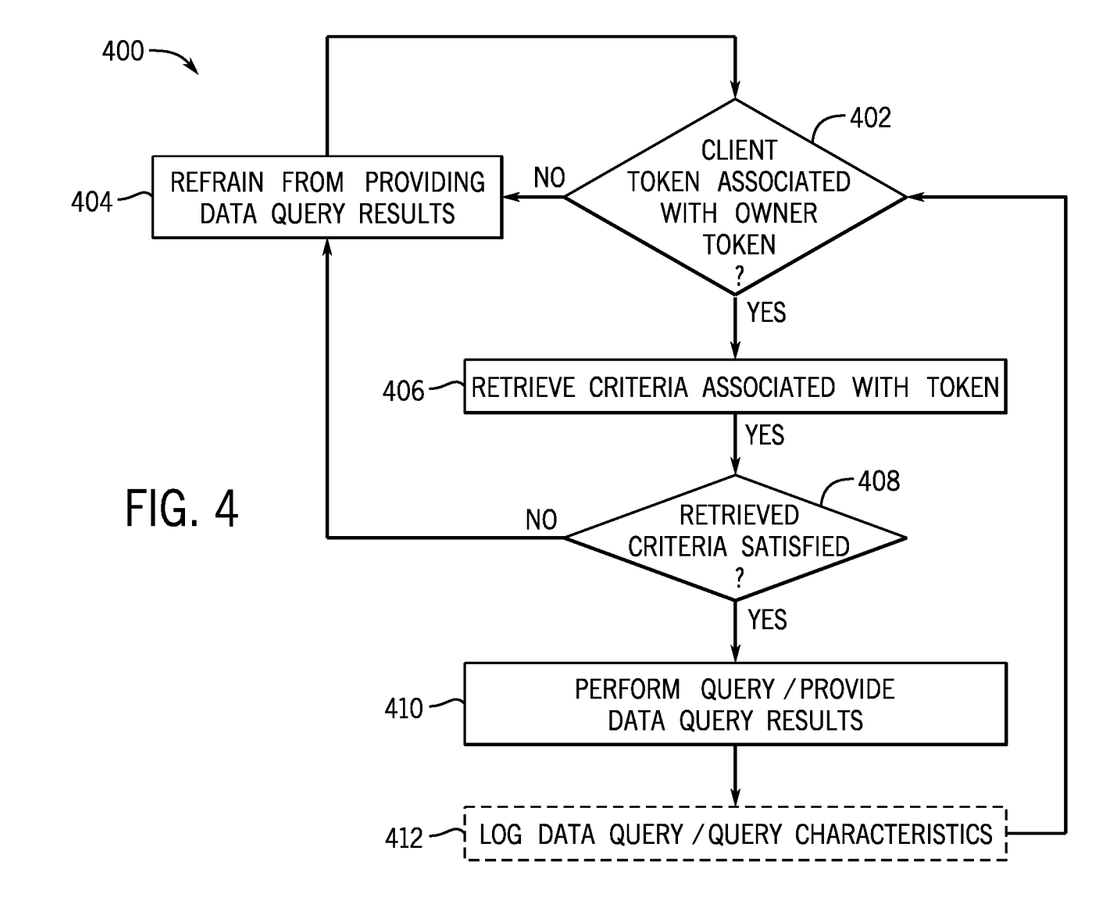
FIG. 4 is a flowchart, illustrating a process for providing controlled data access, in accordance with certain embodiments.

FIG. 4 is a flowchart, illustrating a process 400 for providing controlled data access, in accordance with certain embodiments. The process 400 begins with determining whether a client token is associated with an owner (decision block 402). As mentioned previously, the reporting tool 202 may provide a query and a client token in response to a data request by the client. In some embodiments, the table 208 may be accessed and the owner tokens (e.g., owner token IDs) found in the table 208 are searched for a match to the client token.

If a match to the client token is not found, the system may refrain from providing data query results (block 404). For example, the client shared function may refrain from executing the supplied query, may execute the supplied query but refrain from providing results to the client account, or may otherwise perform an action to prevent the requested data from being provided to the client account.

If, however, a match for the client token is found in the owner tokens, criteria associated with the tokens is retrieved (block 406). For example, in some embodiments, the criteria may be retrieved from data fields of the table 208 that are associated with the matching owner token. In some embodiments, a separate datastore and/or one of the tokens themselves may provide the criteria. For example, in some embodiments, a criteria database may include data fields associated with the client token and/or the matching owner token, which may indicate the access criteria. In some embodiments, the client token and/or matching owner token, when decrypted, may indicate the access criteria.

The access criteria may include a variety of different criteria that are required to be met (or not met) in order to access data. For example, the criteria may specify specific time ranges/periods of access, specific client devices that may be provided access when supplying the client token, an amount of data that may be retrieved via the client token, a number of queries allowed via the client token, specific sets of data that may be accessed, particular shared functions, wrapper functions, etc. that may be accessed via the client token, etc.

A determination is made as to whether the retrieved criteria is satisfied (decision block 408). For example, a clock of the data sharing environment may be compared with timing criteria to identify whether timing constraints are satisfied. Client characteristics of client electronic devices and/or the client account may be discerned by polling or otherwise receiving these characteristics from the client electronic devices and/or the client account. These characteristics may be compared against the retrieved criteria to determine whether the criteria is satisfied.

If the retrieved criteria is not satisfied, the system may refrain from providing data query results (block 404). For example, as mentioned above, the client shared function may refrain from executing the supplied query, may execute the supplied query but refrain from providing results to the client account, or may otherwise perform an action to prevent the requested data from being provided to the client account.

In some embodiments, an indication of the run query and/or characteristics of the run query may be logged (block 412). For example, an amount of data accessed, an indication of the particular data accessed, a number of queries, etc. may be logged in a query history data store (e.g., logfile or log table) for subsequent reporting. The reporting tool may access the query history data store to run reports, such as a per client account report regarding data queries run, wrapper functions accessed, amounts of data retrieved, etc. This may be beneficial for a number of uses. For one, the owner account may use these reports to understand data access characteristics that may result in modifications to the wrapper functions and/or data access provisions. Further, the reports may be used in subscription model schemes that enable the owner account to charge additional fees based upon the data gleaned from the query history. Additionally, by reporting historical actions of the client accounts, the reports may be used to identify potential malicious access attempts where client accounts attempt to access an unintended amount or type of data.

However, if the retrieved criteria is satisfied, the data query may be performed and the data query results may be provided (block 410). For example, an electronic message may be provided to client account that includes the requested data resulting from the query.

Figure 5:
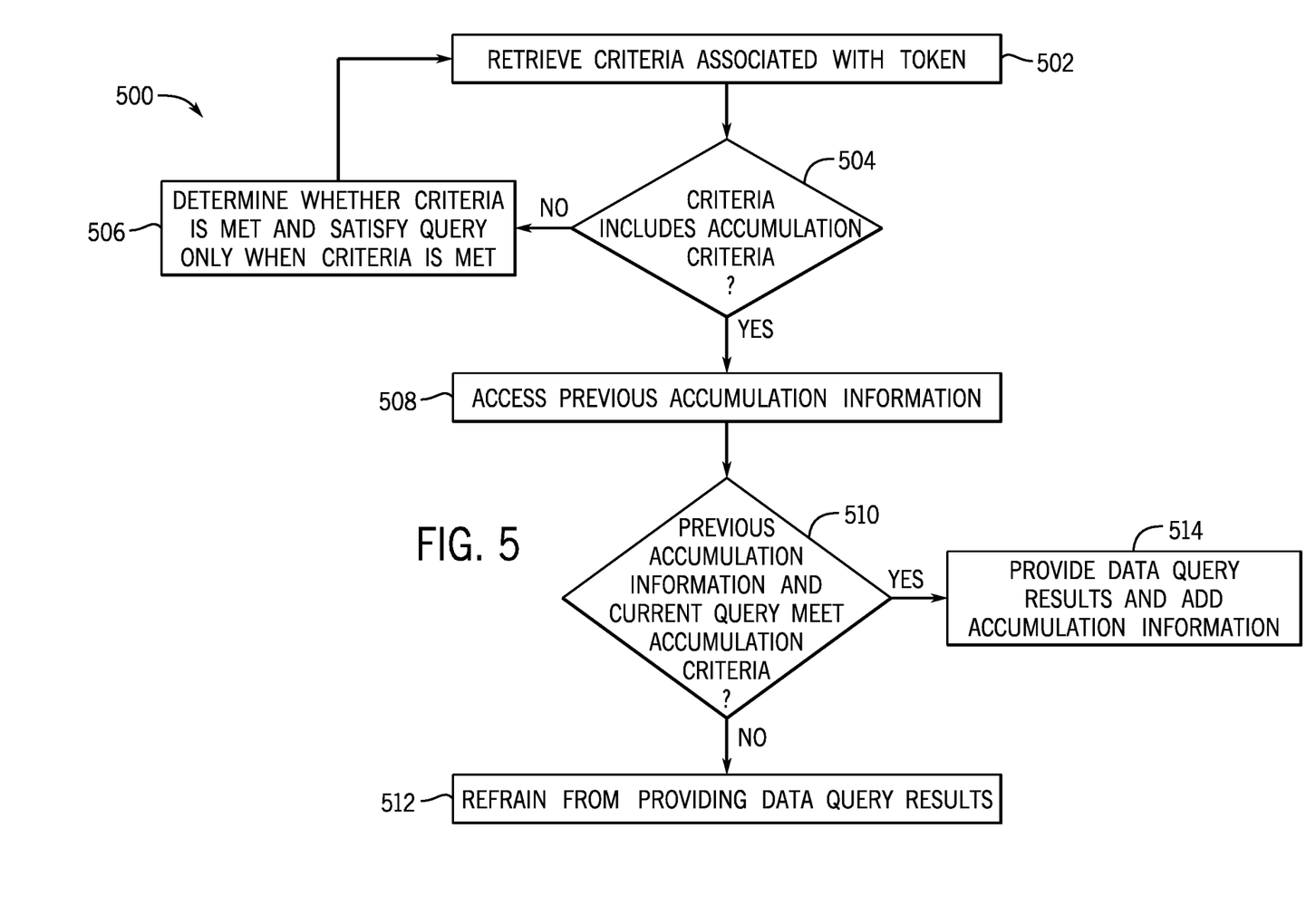
FIG. 5 is a flowchart, illustrating a process for implementing accumulated criteria-based access, in accordance with certain embodiments.

In some embodiments, the criteria may include accumulation criteria that is met (or not met) based upon an accumulation of queries performed using a particular token and/or client account. FIG. 5 is a flowchart, illustrating a process 500 for implementing accumulated criteria-based access, in accordance with certain embodiments.

The process 500 begins with receiving criteria associated with a token (block 502). The criteria may be associated with the client token used to initiate a query and/or associated with an owner token matching the client token. As mentioned above, this criteria may be associated with a token in a table storing the token and/or in a separate criteria datastore.

A determination is made as to whether the criteria includes accumulation criteria (decision block 504). This determination may be made based upon whether the criteria includes any ranges and/or limit criteria that may be reached across a plurality of implemented queries. For example, a criteria setting a maximum amount of data that may be returned to a client account via a number of queries, a maximum number of queries, etc. would be identified as an accumulation criteria.

If the criteria does not include accumulation criteria, the query may be satisfied based upon whether the criteria is met as discussed in the process 400 of FIG. 4. For example, determining whether timing constraints of the current query are met may be determined based upon the timestamp associated with the token and a clock time associated with implementation and/or request of the query. In the current embodiment (e.g., for processing efficiencies), when accumulation criteria is not present, accumulation data is not maintained. However, as discussed above with reject to FIG. 4, in some embodiments, accumulation information (e.g., query history and/or query characteristic history) may be maintained even when accumulation criteria is not present.

When the criteria does include accumulation criteria, the previous accumulation information is accessed (block 508). The previous accumulation information may be a query and/or query characteristic history associated with a particular token and/or client account. The previous accumulation information may include a number of queries that have already been executed using the token, an amount of data returned as query results, an indication of particular subsets of data returned, etc., collected over time as queries are executed based upon allowance via the token.

A determination is made as to whether the previous accumulation information and the current query and/or query characteristics would meet the accumulation criteria, such that the query should be allowed (decision block 510). For example, when the accumulation criteria indicates that no more than $1/3$ of the shared data available to the client account should be shared with the client account, previous accumulation information indicative of an amount of the shared data available that has been previously shared with the client account is accumulated with an amount of data that would be shared with the client account if the client account were to permitted to receive the current query search results, resulting in an indication of whether the current query, if permitted to execute, would satisfy the threshold of no more than $1/3$ of shared available data being shared. As may be appreciated, in some instances, to obtain the current query characteristics needed to make this determination. In such instances, the query may be executed will refraining from providing the query results until after determining the accumulation criteria is met.

If the accumulation criteria is not met by the aggregation of the previous accumulation information and current query, the system may refrain from providing data query results of the query to the client account (block 512). In some instances (e.g. when decision block 510 can be determined without executing the query), the system may refrain from executing the query all together. However, when the query results are needed to determine the decision block 510, the refrain from providing the data query results may include refraining from providing an electronic notification that indicates the query results.

When the accumulation criteria is met by the previous accumulation and current query and/or query characteristics, the query results are provided to the client account and accumulation information tracked by the system (e.g., query count, query data results amount, etc.) is added to the accumulation information, such that additional accumulation criteria inquiries will account for the completed current query.

Figure 6:
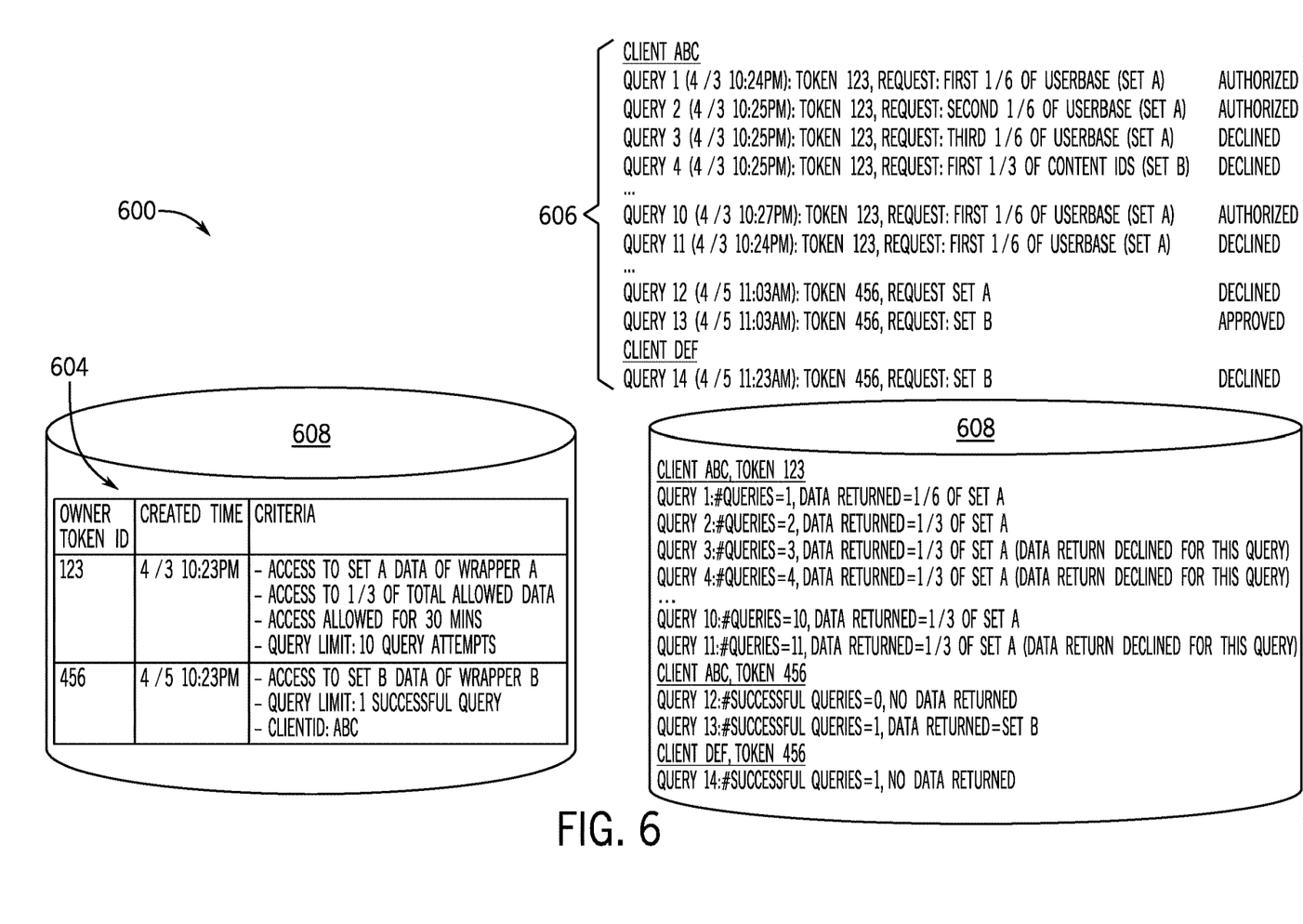
FIG. 6 is a schematic diagram, illustrating an example of the controlled access techniques provided herein, in accordance with certain embodiments.

FIG. 6 is a schematic diagram, illustrating an example 600 of the controlled access techniques provided herein, in accordance with certain embodiments. The example 600 depicts a criteria database 602 storing criteria 604 associated with particular owner tokens. Further, a list 606 of queries executed and/or attempted to execute are provided. As illustrated, in the current example owner token 123, when used to access shared data, is allowed to access data set A provided by a particular wrapper function A. Further, only $1/3$ of available data is allowed to be distributed via accumulated queries, data queries can only be executed for 30 minutes after token creation time, and a total number of queries allowed to execute using the token 123 is 10.

As illustrated in the list 606, Query 1 of Client Account ABC is requested (e.g., via Client Account ABC's shared function) one minute after the owner token 123 was created and would return $1/6$ of the available data (e.g., Userbase (dataset A)). Because all criteria is met by the query, this query is authorized and the $1/6$ of dataset A is returned. The accumulation datastore 608 also adds an indication of accumulation information for the query (e.g., # of queries completed=1 and Amount of Data Returned=$1/6$ of the Available Data).

Query 2 is run 2 minutes after owner token 123 is created and requests a second $1/6$ of the available data by requesting the second $1/6$ of set A. This query also satisfies the criteria, as the number of queries is less than 10, only $1/3$ of the available data would be returned by the accumulated results of queries 1 and 2 (e.g., $1/6$ by query 1 and $1/6$ by query 2), the request is submitted within the 30 minute allowed window.

Query 3 is declined by the shared function, as a third $1/6$ of the available data (e.g., the third $1/6$ of set A) would be returned, causing the threshold allowed data of $1/3$ to be exceeded. Specifically, if the query results of Query 3 were returned, ½ of data set A would be returned to the client account (e.g., ⅙ from Query 1, ⅙ from Query 2, and ⅙ from Query 3), which would no longer meet the criteria. Thus, the shared function may refrain from providing query results from Query 3.

Query 4 is also declined by the shared function. The criteria indicates that token 123 is able to access only data set A via a wrapper function A. In query 4, the client account is requesting a portion of data set B, which results in the criteria not being met. Thus, the shared function will not return query results for Query 4.

In some embodiments, such as the one used in the depicted example, the returned data threshold analysis may refrain from adding counting previously returned data toward the user's returned data allotment, as providing this previously returned data again may not increase the amount of data accessed. Looking at the example of FIG. 6, within the 30 minute time window allowed by the criteria for owner token 123, Query 10 requests the first ⅙ of data set A again. This query is approved as the returned data threshold is not exceeded, the number of queries is still within the query number threshold of 10 and the query is within the 30 minute time window. Accordingly, the query results for Query 10 may be returned to the user account.

In some embodiments, a data provision criteria may look at an amount of data transferred rather than an amount of data accessed. In such a case, repeated provision of already provided data may be counted as provided data toward a data provision threshold specified by the data provision criteria. In this manner, the criteria may look at an amount of data accessed and/or an amount of data provided.

Query 11, on the other hand, is declined, as the maximum number queries is exceeded, thus resulting in the criteria not being met. All other queries using this token will also be declined for the same reason. Thus, no query results are provided to the client account for these queries.

In some embodiments, such as the one depicted in example 600, the number of queries may continue to accumulate even when the query is declined. In other embodiments, declined queries will not be added to a query count. In such embodiments, query 11 may have been allowed because queries 3 and 4 would not have counted toward the query count, resulting in fewer than 10 queries having been executed.

Queries 12-14 illustrate usage of owner token 456 for data access. Query 12 is submitted from client account ABC, requesting all of data set A. This query is declined as the criteria associated with owner token 456 allows access exclusively to data set B via Wrapper Function B. The accumulation information is updated to indicate that no successful queries were performed (here the query count is based upon successful queries rather than query attempts) and that no data was returned.

Query 13 is submitted from client account ABC, requesting all of data set B. Because there were no previous successful queries using this token and the query satisfies the other criteria, the query is approved and the query results are returned to client ABC. The accumulation information is updated to indicate that this query results in a successful query and that all of data set B was returned.

Query 14 is submitted by another client account, client account DEF, requesting data set B. Query 14 is declined for at least two reasons. First, the criteria specifies that only client account ABC is authorized to use the token associated with owner token 456. Further, there has already been a successful query using token 456, as indicated in the accumulation information. Accordingly, the criteria is not met and the query results of query 14 are not provided to client account DEF.

As may be appreciated, the systems and techniques described herein may provide efficient and secure data sharing. The embodiments disclosed herein may provide detailed control of data sharing by data owners, while efficiently and effectively sharing data with clients in a reliable manner.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method for controlling data queries, comprising:
receiving a token based on a data query request from a user;
determining, based on the received token, whether the user is authorized to perform the data query, by:
comparing the received token with a set of stored tokens to determine whether the received token matches a token within the set of stored tokens; and
determining that the user is not authorized to perform the data query when the received token does not match any token within the set of stored tokens; and
providing a response to the user based on the determination of whether the user is authorized to perform the data query.

2. The method of claim 1, wherein the token is received from a reporting module, and the reporting module is configured to generate the token in response to receiving the data query request from the user.

3. The method of claim 2, wherein the reporting module is configured to provide the generated token to a cloud storage account that owns the data to be queried.

4. The method of claim 1, wherein the token is an encrypted token.

5. The method of claim 1, wherein the token comprises a timestamp, and wherein the determining further comprises:
determining whether the timestamp associated with the token is within a predetermined time threshold;
determining that the user is not authorized to perform the data query when the timestamp is outside of the predetermined time threshold; and
determining that the user is authorized to perform the data query when the received token matches a token within the set of stored tokens and when the timestamp associated with the token is within the predetermined time threshold.

6. The method of claim 5, further comprising:
triggering, one or more wrapping functions, based on determining that the user is authorized to perform the data query, wherein the one or more wrapping functions are configured to execute the data query request to return a subset of data.

7. The method of claim 1, further comprising:
tracking a number of times the user has performed data query requests using the token.

8. The method of claim 7, wherein the determining comprises:
identifying whether the number of times the user has performed data query requests using the token breaches a query threshold associated with the token;
determining that the user is not authorized to perform the data query when the number of times the user has performed data query requests using the token breaches the query threshold associated with the token; and
determining that the user is authorized to perform the data query when the number of times the user has performed data query requests using the token does not breach the query threshold associated with the token.

9. The method of claim 1, wherein the response indicates a null value or no rows when the user is not authorized to perform the data query.

10. The method of claim 1, wherein the response comprises a subset of data when the user is authorized to perform the data query.

11. A data sharing system, comprising:
at least one memory; and
at least one processor coupled to at least a portion of the at least one memory and configured to:
receive a data access request via a graphical user interface;
in response to receiving the data access request, determine whether a client account associated with the data access request is entitled to access data requested by the data access request;
in response to determining that the client account is entitled to access the data, generate an owner token and a corresponding client account token associated with a right to access the data;
provide the owner token to an owner account of the data sharing system; and
provide the corresponding client account token and a query to implement to access the data to the client account of the data sharing system.

12. The data sharing system of claim 11, wherein the at least one processor is configured to:
determine, via a shared function of the data sharing system, whether the client account is entitled to implement the query based at least in part upon the corresponding client account token; and
in response to determining that the client account is entitled to implement the query, provide access to data by the client account.

13. The data sharing system of claim 12, wherein the at least one processor is configured to:
determine whether the client account is entitled to implement the query, by:
identifying whether the corresponding client account token corresponds to one of a set of owner account tokens; and
determining whether criteria associated with the one of the set of owner account tokens, the corresponding client account token, or both are satisfied.

14. The data sharing system of claim 13, wherein the criteria comprises: data that may be requested, a maximum number of queries that may be implemented, a maximum amount of data that may be returned to the client account, a time period that a query may be implemented, or any combination thereof.

15. The data sharing system of claim 11, wherein the query comprises an instruction invoking a wrapper function that filters access to raw data within the data sharing system.

16. The data sharing system of claim 11, wherein the data sharing system comprises a data clean room.

17. A tangible, non-transitory, computer readable medium, comprising computer-readable instructions that, when executed by one or more processors of one or more computers, cause the one or more computers to:
receive, via a graphical user interface (GUI), a data access request via a graphical user interface;
in response to receiving the data access request, generate an owner token and a corresponding client account token associated with a right to access data requested by the data access requested;
provide the owner token to an owner account of a data sharing system; and
provide the corresponding client account token and a query to implement to access the data to a client account of the data sharing system.

18. The tangible, non-transitory, computer-readable medium of claim 17, comprising computer-readable instructions that, when executed by the one or more processors of the one or more computers, cause the one or more computers to:
associate one or more criteria for access to the data via the owner account;
determine, via a shared function between the owner account and the client account, whether the criteria for access is satisfied; and
in response to determining that the criteria for access is satisfied, provide query results of the query to the client account.

19. The tangible, non-transitory, computer-readable medium of claim 17, comprising computer-readable instructions that, when executed by the one or more processors of the one or more computers, cause the one or more computers to:
cause the client account to implement the query via a shared function between the owner account and the client account, wherein the query accesses a wrapper function that filters raw data to access the data via the client account.

* * * * *